Feb. 19, 1952 C. MEMLUCK 2,586,074
LINE PROTRACTOR
Filed Dec. 10, 1949
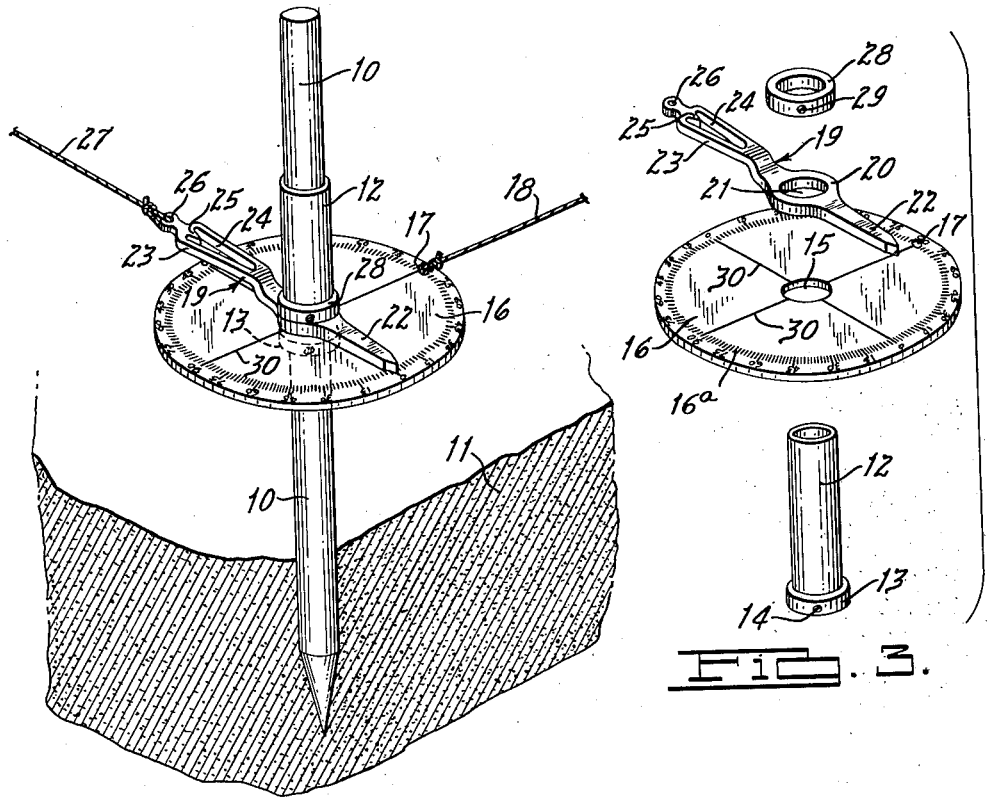
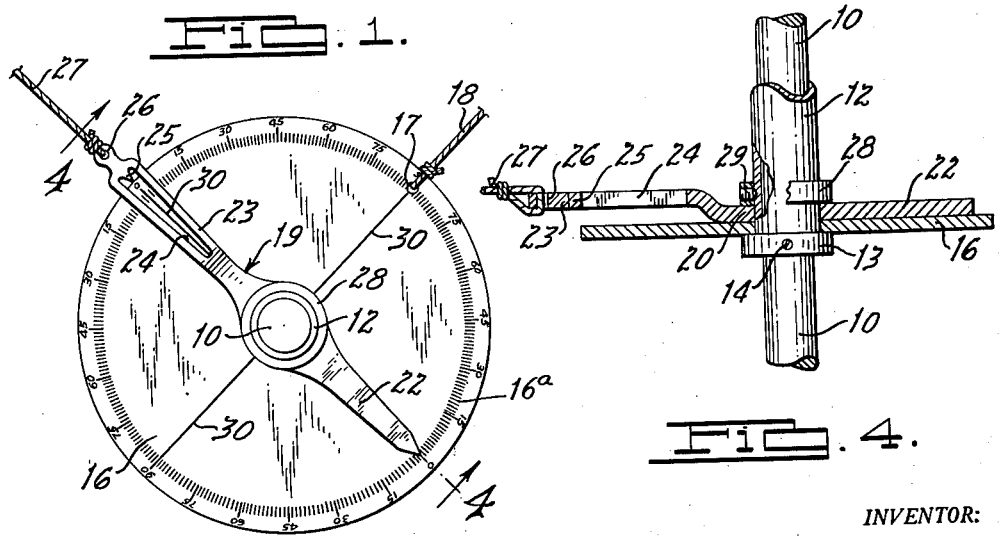
INVENTOR:
Charles Memluck,
BY Louis Chayka
ATTORNEY.

Patented Feb. 19, 1952

2,586,074

UNITED STATES PATENT OFFICE 2,586,074

LINE PROTRACTOR

Charles Memluck, Utica, Mich.

Application December 10, 1949, Serial No. 132,360

2 Claims. (Cl. 33—1)

The object of my improvement is to provide a device for use of builders and contractors who may be in need of an instrument simple in construction and yet fully practical in determining horizontal outlines of proposed excavations, buildings, etc.

Another and more specific object of my improvement is to provide such a protractor which will be adapted to be used in pairs, each of the protractors being used in combination with other elements whereby lines at angles of 90 degrees to the baseline passing through the axis of both protractors will be automatically indicated on the respective protractors.

I shall now describe my improvement with reference to the accompanying drawings, in which:

Fig. 1 is a perspective view of my protractor set up for use;

Fig. 2 is a top plan view of the protractor shown in Fig. 1;

Fig. 3 is an exploded view of the component parts of my protractor, the parts being shown in perspective;

Fig. 4 is a sectional view on line 4—4 of Fig. 2.

Similar numerals refer to similar parts throughout the several views.

The protractor is to be used in conjunction with a vertical stake 10 which is to be driven into the ground 11 and fits telescopically over said stake. For that purpose the protractor includes a sleeve 12, including at its lower end a flange 13. A set screw 14 disposed radially with respect to the stake serves as a means of retaining the sleeve on the stake at a desired height from the surface of the ground 11.

Supported by the flange 13 is the protractor proper made in the shape of a disk 16 which is provided with a centrally located circular aperture 15 to fit over the outer surface of said sleeve 12. The upper surface of the disk is divided by two diametrically-disposed lines 30 crossing each other at right angle and dividing said surface into quadrants, while the marginal portion of said surface in each quadrant is calibrated in degrees, as indicated by numeral 16, the calibrations beginning from zero at the ends of one diametrical line and rising to 90 degrees in both directions, that is clockwise and anti-clockwise, as best shown in Fig. 2. While this calibration is preferred, it is not considered critical, permitting any other arrangement to be used if desired. At a point 17 at the end of one diametrical line the disk is perforated, permitting attachment of a cord 18.

Seated upon the disk is an angle indicator, generally identified by numeral 19. The indicator includes a hub portion 20 provided with a circular aperture 21 to fit over said sleeve 12, a pointer 22, and a shank 23. The latter has a longitudinal slot 24, permitting the calibrations 16a to be viewed from above. A V-shaped wedge 25 within the slot with a sharp end pointing at the calibrations helps in quickly identifying the same. An eye 26 at the outer end of the shank serves as a means for attachment of another cord 27. It will be noted that the shank portion of the indicator 19 is raised above the surface of the disk 16 but is disposed parallel thereto. Finally, to complete the assembly of the elements comprising my protractor, a collar 28 is placed above the hub 20 of the indicator 19. The collar secured in place by a set screw 29. The collar is in contact with said hub 20 but is set in such a manner as not to interfere with the rotation of either the indicator 19 or the disk 16.

The operation of my device is quite obvious. Once the baseline has been determined, as, for example, in laying the foundation of a building, a stake is driven into the ground on said baseline at the intersection with an intended cross-line. Another stake is driven on the same baseline at the intersection with another cross-line. Two protractors, as described by me, are seated on the above-named stakes, and the disks thereof are connected by cord 18. This will automatically align one diametrical line 30 on each disk with said baseline and will set the other diametrical line on each disk at 90 degrees to said baseline. If the cross-lines are to be set at 90 degrees to the baseline, all that is needed to be done is to align the respective indicator with said diametrical line 30, as shown in Figs. 1 and 2. If any other angles are desired the calibrations on the respective disk will quickly indicate the setting. Cord 27 attached to the respective indicator may be extended from each protractor to a desired length, drawn taut, and fastened where desired. The respective angle of the indicator will be shown by calibrations as read with respect to the tip of pointer 22 or the wedge 25 in shank 23.

It will be obvious that some changes may be made in the structure of my protractor without deviating from the basic principle disclosed herein.

What I, therefore, wish to claim is as follows:

1. A device of the kind described, said device comprising, in combination, a vertical stake, a tubular sleeve thereon, the sleeve being provided with a flange at its lower end, screw means within the flange to secure the sleeve against rotation on the stake, a disk-like protractor resting on the flange and adapted to be rotated about said sleeve, the upper surface of the protractor being divided into quadrants by two diametrical lines set at right angle to each other, means at the end of one of said lines for attachment of a cord, the marginal portion of the disk being calibrated in degrees, and an indicator mounted above the protractor for rotation about said sleeve, the indicator including a hub surrounding said sleeve, a pointer extending radially from the hub in one direction and a shank extending from the hub in the opposite direction, the shank being provided with means for attachment to a cord.

2. In combination with an upright stake, a stationary sleeve mounted thereon, a horizontal disk mounted for rotation on the sleeve about the axis thereof, the disk having on its upper surface two diametrical lines crossing each other at right angle, and a hole at the end of one line for attachment of a cord, the periphery of the disk being calibrated in degrees, an elongated indicator having a hub surrounding the sleeve, said indicator including a portion extending from the hub towards said calibrations and a shank extending from the hub in the opposite direction and having a hole at the outer end for attachment of another cord, said shank being provided with a vertical slot, and a wedge-shaped member within the slot, the point of the wedge being directed towards a respective calibration.

CHARLES MEMLUCK.

REFERENCES CITED

The following references are of record in the file of this patent:

UNITED STATES PATENTS

| Number | Name | Date |
|---|---|---|
| 339,682 | Nilsen | Apr. 13, 1886 |
| 661,483 | Barrie | Nov. 13, 1900 |
| 868,700 | Roberts | Oct. 22, 1907 |
| 1,346,050 | Nicholson | July 6, 1920 |
| 1,368,857 | Stevens | Feb. 15, 1921 |
| 1,401,200 | Smith | Dec. 27, 1921 |
| 2,068,822 | Schiesser | Jan. 26, 1937 |

FOREIGN PATENTS

| Number | Country | Date |
|---|---|---|
| 81,989 | Austria | Dec. 27, 1920 |
| 108,744 | Sweden | Oct. 12, 1943 |